United States Patent [19]

Murakami et al.

[11] Patent Number: 5,361,648
[45] Date of Patent: Nov. 8, 1994

[54] ROLLING-SLIDING MECHANICAL MEMBER

[75] Inventors: Yasuo Murakami; Yasuo Utsumi; Shoji Noguchi, all of Kanagawa; Yasuyuki Shimasaki, Gunma; Hiroshi Iwasa; Satoshi Kadokawa, both of Kanagawa, all of Japan

[73] Assignee: NSK Ltd., Tokyo, Japan

[21] Appl. No.: 43,214

[22] Filed: Apr. 6, 1993

[30] Foreign Application Priority Data

Apr. 7, 1992 [JP] Japan .................. 4-113196
Oct. 21, 1992 [JP] Japan .................. 4-305847

[51] Int. Cl.$^5$ .......................... F16H 53/06
[52] U.S. Cl. ................. 74/569; 123/90.39; 123/90.51; 384/912; 74/559
[58] Field of Search ............ 74/519, 559, 569; 123/90.39, 90.41, 90.42, 90.44, 90.51; 384/912

[56] References Cited

U.S. PATENT DOCUMENTS

| 4,632,074 | 12/1986 | Takahashi et al. | 74/559 X |
| 4,643,144 | 2/1987 | Fingerle et al. | 74/559 |
| 4,856,469 | 8/1989 | Okazaki et al. | 74/559 |
| 4,870,931 | 10/1989 | Nakamura et al. | 123/90.51 X |
| 4,873,150 | 10/1989 | Doi et al. | 123/90.51 |
| 4,936,270 | 6/1990 | Ushio et al. | 123/90.39 |
| 4,983,468 | 1/1991 | Oda | 384/912 |
| 5,035,959 | 7/1991 | Ito et al. | 123/90.33 X |
| 5,052,352 | 10/1991 | Taniguchi et al. | 123/90.39 |
| 5,054,440 | 10/1991 | Kadokawa | 74/559 X |
| 5,159,852 | 11/1992 | Harimoto | 74/559 |

FOREIGN PATENT DOCUMENTS

| 60-63350 | 4/1985 | Japan | 123/90.39 |
| 1-30008 | 6/1989 | Japan . | |
| 2-17607 | 4/1990 | Japan . | |
| 3-117724 | 5/1991 | Japan . | |
| 4-54312 | 2/1992 | Japan . | |

OTHER PUBLICATIONS

"Roller Rocker Arm And The Reduction Of Friction", Automotive Engineering (Japan), pp. 30–43, 243 (Jul. 19, 1989).

Primary Examiner—Vinh T. Luong
Attorney, Agent, or Firm—Foley & Lardner

[57] ABSTRACT

The rolling/sliding outer ring of the cam follower apparatus withstand peeling very well, even in sever lubrication conditions, through the steps that on the outer peripheral surface of the outer ring, the depth of the surface layer is taken to be 0 to 50 $\mu$m, and the maximum residual compressive stress in this surface layer is between 50 and 110 kgf/mm$^2$, the hardness of this surface layer is between Hv830 and Hv960, and the average wavelength of the very minute protrusions on the surface is less than 25 $\mu$m, and the amount of residual austenite in the surface layer exceeds 7 volume %, after processing, while the inner peripheral surface, of the outer ring is superfinished.

2 Claims, 3 Drawing Sheets

ROLLING-SLIDING MECHANICAL MEMBER

BACKGROUND OF THE INVENTION

1. Field of the Invention

This invention relates to a cam follower apparatus, specifically, a rolling/sliding member such as the outer ring of a cam follower apparatus in the valve drive mechanism of an engine.

2. Description of the Prior Art

There are many kind of automobile engines including reciprocating piston type engines, all of which except for some 2-cycle engines, have air-intake valves and exhaust valves, which open and close in phase or synchronizing with the rotation of the crank shaft.

A valve drive mechanism is used to transmit the motion of the cam, attached to the cam shaft, to the valves as the cam shaft rotates with the engine's crank shaft.

There are many kinds of valve drive mechanisms for driving the air-intake valves and exhaust valves. For example, in the valve drive mechanism of a SOHC-type engine, as shown in FIG. 3, the single cam shaft rotates at ½ the speed of the crank shaft (for a 4-cycle engine), to drive the air intake valve 17 and exhaust valve 18 by way of the rocker arms 16. Specifically, the cams 19 are attached to the cam shaft 15 which rotates in phase with the crank shaft 14, so that they come in contact with the ends of the rocker arms 16 to drive the air-intake valve 17 and exhaust valve 18.

In recent years, it has been widely practiced to equip the valve drive mechanism with a cam follower, so that when the valve drive mechanism is in operation, the friction that occurs is transformed from sliding friction to rolling friction, thus keeping the friction loss to a minimum.

In order to reduce the friction force, which occurs between the edge of the cams 19 and its mating member such as rocker arms 16 while the engine is running, and in order to reduce fuel consumption when the engine is running, it has become common practice to place a cam follower apparatus, at the point of contact, that rotates with the rotation of the cams 19.

This kind of cam follower apparatus has an outer ring which is placed in a rolling and/or sliding contact with the other parts.

As shown in FIG. 4 thru FIG. 6, a pair of supports wall portions 20 with a space therebetween are located at the end of the rocker arm 16 facing to the cam 19, and both ends of a shaft 21 are attached to support wall portions 20. A short, cylindrical shaped outer ring 23 is located around this shaft 21, and comes in contact with the shaft 21 by way of rollers 22, or comes in contact with the shaft 21 directly. The outer peripheral surface of this outer ring 23 comes into contact with the outer peripheral surface of cam 19, so that as cam 19 rotates, the outer ring 23 rotates around the shaft 21.

By using this kind of outer ring 23, the friction, between the cam 19 and the parts that come in contact with it, is changed from sliding friction to rolling friction, thus lowering the fuel consumption rate.

When this kind of cam follower apparatus is installed in the valve drive mechanism of an engine, however, damage, such as pitting, easily occurs on the outer peripheral surface of the cam 19, caused by the fluctuating load that is applied to the outer peripheral surface of the cam 19 by the outer peripheral surface of the outer ring 23.

When the rolling/sliding member is used in severe lubrication conditions, only the ends of very minute protrusions formed on the surface of the member come in direct contact (metallic contact) with the surface of the mating parts without a film of oil between them. In this case, most of the load applied to the rolling/sliding member is supported by the load with several minute protrusions which come in contact with the opposition parts, so that large stress concentrations, together with tangential forces are applied to each minute protrusion.

Due to the stress concentrations and tangential forces, small cracks occur on the surface of the rolling/sliding member, and as these cracks advance, peeling occurs.

In order to prevent friction, the surface of the rolling/sliding member could be made so harder, but, by increasing the hardness in such a degree, cracks are more easily caused by the high stress concentrations, which leads to the peeling.

In order to improve the durability of the surface of the rolling and/or sliding member, many inventions have been proposed in the past with respect to the improvement of the surface condition.

As was described on page 39 of the special issue, "Roller Rocker Arm and the Reduction of Friction", in the July, 1989 edition of the magazine, "Automotive Engineering(Japan)", the cam shaft 15 including the cam 19, is made of very strong and hard metal material, such as, hardened cast iron, chilled cast iron, hardened steel, or a sintered alloy, that can withstand pitting.

Japanese Patent Publication No. H1-30008, discloses an invention relating to a bearing roller having a rolling surface of which the surface roughness, Rmax, is between 0.3 to 1.5 $\mu$m, and which is formed with scratches in random directions, and a surface layer having a residual stress of 50 kgf/mm$^2$ or more.

Also, Japanese Patent First Publications No. H3-117723 to No. H3-117725, discloses an invention relating to forming several depressions at random on the rolling surface using barrel processing, and in addition making the hardness of the surface layer harder than the inside or bulk hardness, such that residual compressive stress is caused to occur in the surface layer.

Moreover, Japanese Patent First Publication No. H3-199716 discloses a bearing, where the surface that contacts other parts is hardened using a surface hardening process, and where the depth of the peak value of the residual compression stress is equal to the depth of the peak value of the shear stress distribution.

Also, Japanese Patent First Publication No. H4-54312 discloses an invention relating to bearing parts, where the residual compressive stress, formed by using a shot peening process, is 100 kgf/mm$^2$ or more on the surface, and the stress is 40 kgf/mm$^2$ or more at 300 $\mu$m below the surface.

Japanese Patent Publication No. H2-17607 discloses a surface processing method where shots are provided in the range of 40 to 200 $\mu$m is size to have a hardness equal or higher than the hardness of the product, and the shots are projected over the surface of the product at a speed equal to or higher than 100 m/sec so as to increase the temperature around the surface higher than the As transformation point.

In these aforementioned inventions, depending on the operating conditions, excellent durability is obtainable. However, when these inventions are applied to the rolling and/or sliding members which are used in conditions of poor lubrication in a rolling and/or sliding contact with other parts, it is impossible to obtain sufficient durability.

For example, when these inventions are applied to a cam follower apparatus which has an outer ring in a rolling and/or sliding contact relationship with the outer peripheral surface of the cam while the engine is running, peeling may occur, shortening the life of the follower.

In the case where the cam shaft 15 including the cam 15 is made of very strong and hard metal material such as the quench-hardened cast iron as in "Automotive Engineering(Japan)" as mentioned previously, the peeling is inclined to occur on the outer peripheral surface of the outer ring 23 in contact with the cam 19.

Specifically, it is difficult to finish the outer peripheral surface of the cam 19 made of a hard metal material such as the quench-hardened cast iron, and a lot of minute protrusions are formed on the outer peripheral surface of the cam 19, as shown in FIG. 8, which has been subjected to the normal industrial surface finishing method. The surface roughness of the outer peripheral surface is relatively rough, that is about 0.4 $\mu$m Ra to 0.8 $\mu$m Ra.

On the other hand, the outer ring 23 is made of bearing steel which is harder than the cam 19, and usually subjected to the superfinish on its surface because the outer ring 23 has a simpler shape and is easier to be processed than the cam shaft 15 including the cam 19.

Accordingly, the outer peripheral surface of the outer ring 23 is smoothly finished as shown in FIG. 7 and FIG. 8 with the surface roughness around 0.05 $\mu$m Ra, so that the outer peripheral surface of the outer ring 23 has a limited amount of lubricant 24 on it, which may lead to the occurrence of peeling when the outer ring 23 is installed in a cam follower apparatus and experiences rolling/sliding contact with the outer peripheral surface of the cam during the engine running.

In OHC-type and DOHC-type engines, where the valve drive mechanism is placed on top of the engine, the supply of lubricating oil to the valve drive mechanism is insufficient, so that when the engine is running, the lubrication condition becomes very severe. In this kind of condition, when a rolling and/or sliding contact relationship is provided between the outer peripheral surface of the outer ring and the outer peripheral surface of the cam, 5 to 10 $\mu$m deep peeling usually occurs on the outer peripheral surface, so that the life of the outer ring is shortened.

Of the technology mentioned above, in the invention described in Japanese Patent First Publication No. H4-54312, if the lubrication condition is severe, regardless of the friction conditions, peeling cannot be sufficiently prevented.

Also, in the invention described in Japanese Patent First Publication No. H3-199716, there is no real problem when the friction is only rolling friction, however, when sliding friction occurs, peeling cannot be sufficiently prevented.

Moreover, in the inventions described in Japanese Patent Publications No. H1-30008, and No. H3-117723 to No. H3-117725, if the lubrication condition is severe, and if the operating conditions are severe, such as a large contact load, again peeling cannot be sufficiently prevented.

The bearing part of Patent Publication No. H2-17607 can not afford to provide enough anti-peering property if no additional process is added.

SUMMARY OF THE INVENTION

The objective of this invention is to provide a cam follower apparatus including a rolling/sliding member or outer ring that takes into consideration the aforementioned conditions, and where peeling can be sufficiently prevented, even under severe lubrication conditions.

The rolling/sliding member of this invention is to be used in conditions of rolling and/or sliding contact with other parts. More particularly, the rolling/sliding member such as an outer ring of the cam follower apparatus of this invention has a surface layer which has a depth of 0 to 50 $\mu$m from the surface, such that the maximum residual compressive stress in this surface layer is 50 to 110 kgf/mm$^2$, and that the hardness of this surface layer is Hv830 to Hv960, the average wavelength of the surface roughness is 25 $\mu$m or less, and the residual austenite ratio in microstructure exceeds 7 volume %.

DESCRIPTION OF THE PREFERRED EMBODIMENTS

Figure 1:
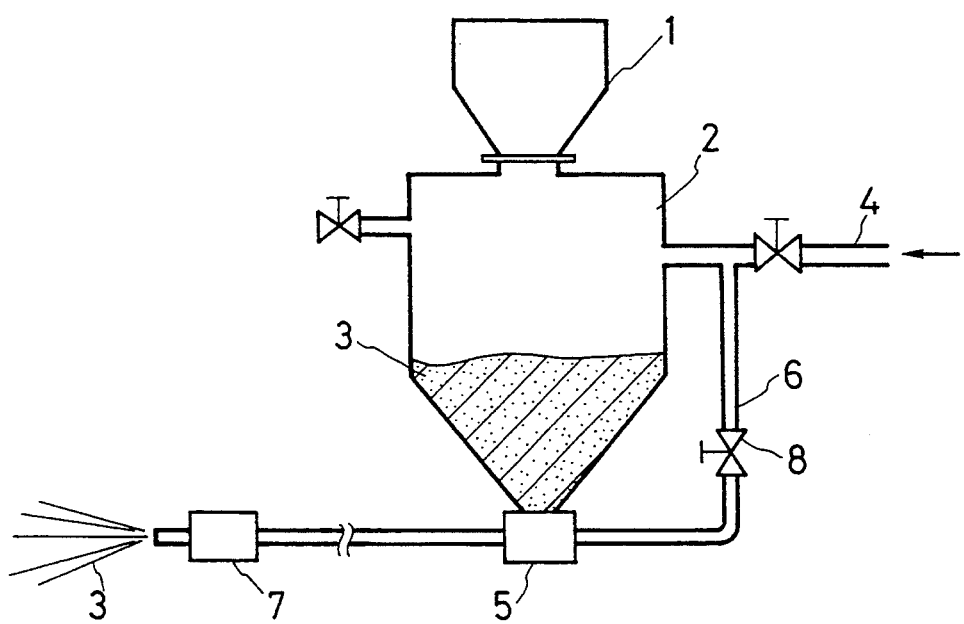
FIG. 1 is a cross-sectional view of a shot peening device used for evaluation in the present invention.

It is possible to effectively prevent 5 to 10 $\mu$m peeling from occurring on the rolling/sliding member of this invention, and to improve durability in the member.

In this invention, because the hardness of the surface layer is regulated between Hv830 and Hv960, it is possible to prevent cracking, which is the cause of peeling while substantially preventing friction. If the hardness is less than Hv830, cracking does not occur, however friction becomes severe, and conversely, if the hardness exceeds Hv960, friction is highly suppressed, however cracking occurs more easily, and so in either case, life of the rolling/sliding member is reduced.

Also, when the maximum residual compressive stress is increased, cracking even produced can be prevented from propagating more, which is very important in order that peeling, due to cracking, does not occur.

However, if the rolling/sliding member is processed so that the maximum residual compression stress on its surface exceeds 110 kgf/mm$^2$, the surface hardness then exceeds Hv960. Therefore, the maximum residual compressive stress is limited up to 110 kgf/mm$^2$.

On the other hand, if the maximum residual compressive stress is less than 50 kgf/mm$^2$, advancement of cracking is not effectively prevented. Therefore, the maximum residual compressive stress must be at least 50 kgf/mm$^2$.

The surface roughness affects the capability to form an oil film between the surface of the rolling/sliding member and the surface of the opposing parts. The smaller the roughness pitch (wavelength) is, the easier it is to form an oil film. The inventor has found, through experimentation, that if the wavelength is 25 μm or less, the ability to form an oil film is greatly improved. Therefore, the average roughness wavelength is regulated to be 25 μm or less.

In this invention, the average wavelength of the surface roughness, λ, is given by, $\lambda = 2\pi \cdot R/\theta$.

Where, R is the average roughness of the surface, and θ is the average of the absolute value of the inclination angle of the minute protrusions on the surface.

By shortening the average wavelength, λ, of the surface roughness, the ability to hold lubrication oil in the spaces between the many minute protrusions on the surface, and therefore the ability to form the oil film between the rolling/sliding member and the mating parts, is improved, so that it is made more difficult for cracking which causes peeling, to occur.

Furthermore, if there is a large amount of ductile austenite remaining in the microstructure of the rolling/sliding member, prevention of cracking can be expected. However, if the amount of residual austenite in the microstructure is less than 7 volume %, it cannot be expected to be effective in preventing cracking. Also, in order to keep the maximum residual compressive stress and the hardness within the ranges mentioned above, it is necessary that the percentage of residual austenite must exceed 7 volume %.

In other words, the values of the maximum residual compressive stress and hardness of the surface layer could not exceed the upper limits, specifically 110 kgf/mm$^2$ and Hv960, respectively, if the decomposition rate of austenite in this process (percentage that austenite is reduced during the process) is held to 30% or less.

Before the surface is processed, the percentage of austenite in microstructure in the bearing steel (SUJ2 etc.) is about 11 volume %. Accordingly, in order that the maximum residual compression stress and hardness do not exceed their upper limits, it is necessary that the percentage of austenite after processing must exceed 7 volume %. If the shot peening process is too weak, the maximum residual compression stress and hardness will be less than the lower limits, specifically 50 kgf/mm$^2$ and Hv830.

The outer ring comes into contact along its outer peripheral surface with the cam 19 and along its inner peripheral surface with the shaft 21 or the roller 22, and when the whole surfaces of the outer ring is processed to have properties as mentioned above, the peeling is prevented from occurring on the outer peripheral surface of the cam 19 and the outer peripheral surface of the outer ring, but the rolling surface of the roller 22 having a smooth surface through superfinish is very subject to peeling, and abrasion easily occurs on the outer peripheral surface of the shaft. This is prevented by superfinishing on the inner surface of the outer ring.

When the oil film parameter Λ is provided by h/σ, where "h" is the thickness of EHL oil film, and "σ" is the roughness, the oil film parameter is sufficiently large between the inner peripheral surface of the outer ring and the outer peripheral surface of the roller or shaft, both of which are subjected to superfinish. Accordingly, lubrication is sufficiently made between the inner peripheral surface of the outer ring and the outer peripheral surface of the roller or shaft to prevent peeling on the rolling surface of the roller and abrasion on the outer peripheral surface of the shaft. Consequently, durability is enlarged on the whole cam follower apparatus with the outer ring installed therein.

In order to confirm this invention, an embodiment of the method for processing the surface of the rolling/sliding member, specifically outer ring, according to this invention will be described below, with experimental results.

In performing experimentation, as shown in Table 1, four kinds of test specimens were prepared according to this invention, and eight kinds specimens for comparison were prepared, giving a total of 12 kinds of test specimens. All of the test specimens were made of bearing steel (SUJ2).

Before performing the desired surface processing, they were all normally quenched, specifically oil quenched after being heated at a temperature from 800° to 850° C., and tempered at a temperature from 150° to 200° C. The test specimens had an outer diameter of 20 mm, an inner diameter of 13 mm, and a thickness of 8 mm in a short cylindrical form.

Test specimen No. 1 for comparison was polished simply by using a polishing cloth, and the surface did not undergo the shot peening process for hardening. All of the other eleven test specimens, No. 2 thru No. 12, underwent the same shot peening process as was described in Japanese Patent First Publication No. H4-54312, using a shot peening device as shown in FIG. 1, to harden the surface and to produce a large residual compressive stress in the surface layer.

Next, the construction and operation of the shot peening device shown in FIG. 1, will be described briefly. First, the very small shots 3 are input from the hopper 1 into the pressure tank 2, and are pushed into the mixer 5 by the compressed air flowing into the pressure tank 2 from the air-supply pipe 4. Then, they are pushed to the nozzle 7 by the compressed air flowing into the mixer 5 from the branch pipe 6, and then they are forcefully blown through the nozzle 7 at the surface to be processed. As a result, the surface being processed is hardened, so that residual compressive stress is created on the processed surface with very small depressions formed on the surface.

The shots 3, used for all of the test specimens, No. 2 thru No. 12, were steel balls, and had an average diameter of 0.03 to 0.7 mm, and an average hardness of H$_R$C 61. Also, the projection velocity of the shots 3 (initial velocity of the shots 3 blown from the nozzle 7) was 32 to 120 m/sec (average projection velocity was 80 m/sec). The projection velocity was adjusted by closing or opening the adjustment valve 8 located in the midway of the branch pipe 6. The residual compressive stress, produced on the surface of each of the test specimens, No. 2 thru No. 12, was adjusted by adjusting this projection velocity.

For test specimens No. 9 thru No. 12, which were made according to this invention, after the shot peening process was performed with the steel ball shots, they underwent a secondary shot peening process using shots, such as glass beads or ceramic beads, lighter than the steel ball shots. The shots used in this secondary shot peening process had an average diameter of 0.05 mm or less.

The secondary shot peening process, using lighter shots, was performed in order to change the roughness of the surface (to roughen the surface and shorten the average wavelength), without changing the hardness and the residual compressive stress of the surface layer.

The shot peening process was performed on eight specimens at the same time so that the substantially same eight specimens were prepared for measurement of the hardness of the surface layer, the residual stress in the surface layer, the amount of austenite remaining in the surface layer, and the average wavelength of the surface roughness, respectively.

Figure 2:
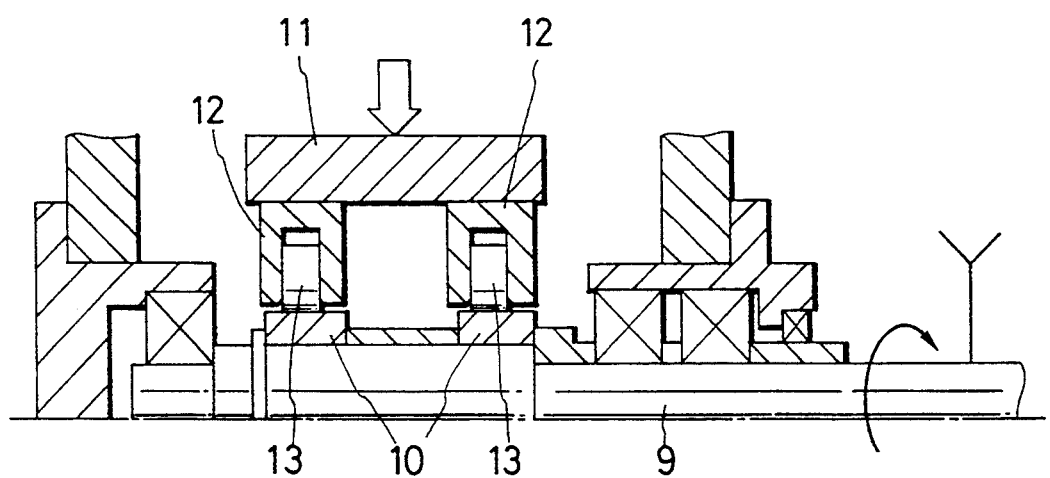
FIG. 2 is a cross-sectional view of an endurance testing device used for evaluation in the present invention.
Figure 3:
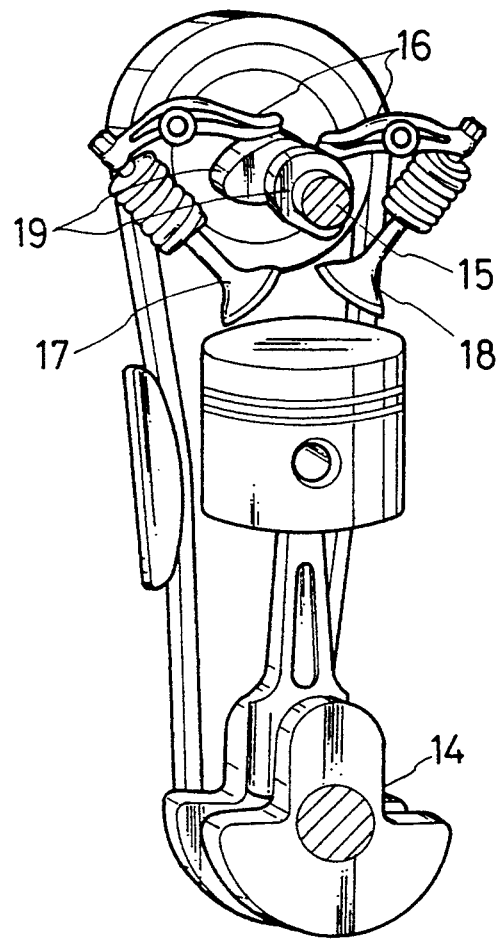
FIG. 3 is a perspective view showing an example of the valve drive mechanism of an engine.
Figure 4:
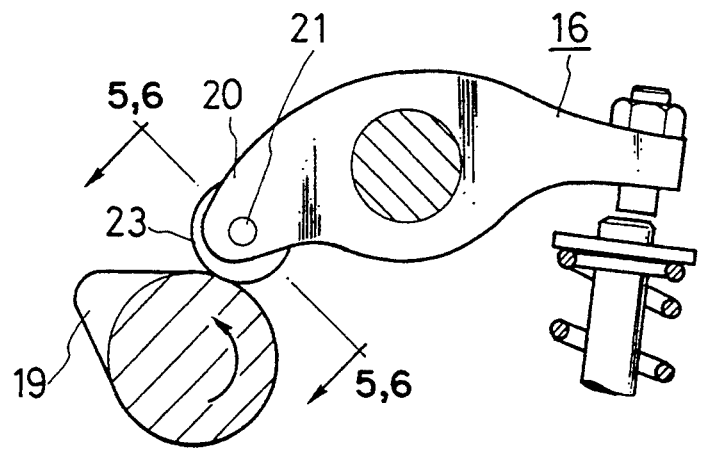
FIG. 4 is a side elevational view of a cam follower apparatus installed in the valve drive mechanism of FIG. 3.
Figure 5:
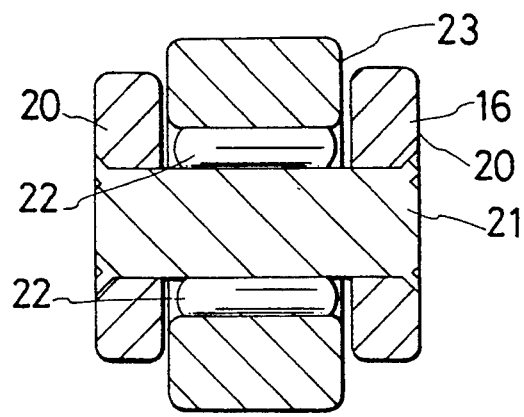
FIG. 5 is a view taken along line A—A of FIG. 4 in a case of the rolling bearing.
Figure 6:
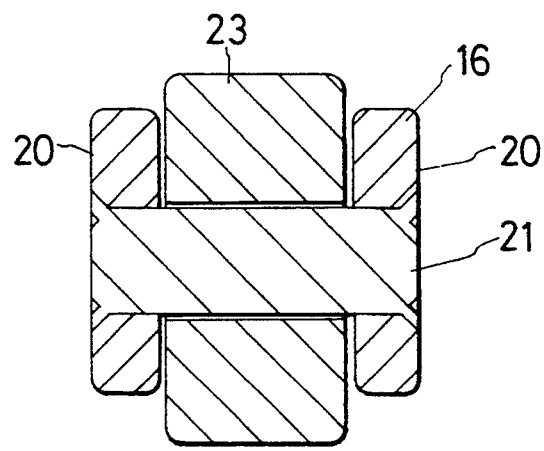
FIG. 6 is a view of taken along line A—A of FIG. 4 in a case of the sliding bearing.
Figure 7:
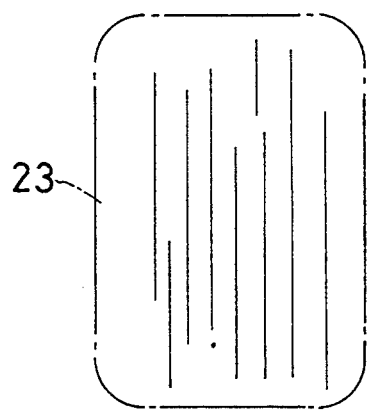
FIG. 7 is a plan view showing scratches remained on the outer peripheral surface of the conventional outer ring.
Figure 8:
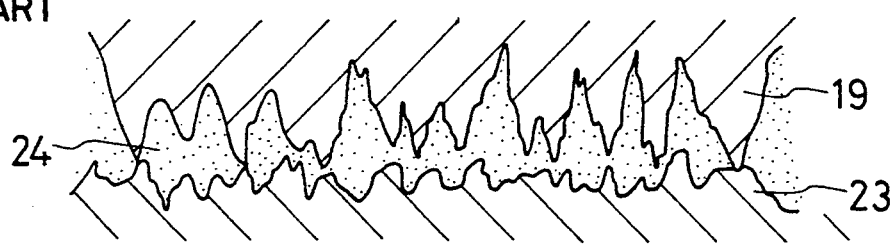
FIG. 8 is an enlarged cross sectional view of a portion of FIG. 7 including the mating surfaces of the outer ring and the cam.

Then an endurance test was performed on the total 96 test specimens, eight for the test specimens, No. 1 thru No. 12 respectively, using the test equipment as shown in FIG. 2.

was ended for those test specimens 13. The test results were provided in the peeling evaluation column of Table 1. The evaluation was made as follows; if all of the eight test specimens were tested for 400 hours with no peeling, Symbol ⊙ was recorded, if peeling occurred in 1 to 3 of the eight specimens, Symbol O was recorded, if peeling occurred in 4 to 7 of the eight specimens, Symbol Δ was recorded, and if peeling occurred in all of the eight specimens, Symbol X was recorded.

As can be clearly seen from Table 1 showing the results of the endurance test, for the rolling/sliding member of this invention, peeling was sufficiently prevented, even under severe lubrication conditions.

TABLE 1

| Test Specimen No. | Shot Peening Process | Surface Layer Hardness (Hv) | Maximum Residual Stress in Surface Layer (Kg/mm$^2$) | Residual Austenite in Surface Layer (Volume %) | Average Wavelength of Surface Layer Roughness (μm) | Peeling Evaluation | Inner Peripheral Surface of Outer Ring | |
|---|---|---|---|---|---|---|---|---|
| | | | | | | | Finishing Process | Evaluation of Rolling Contact Surface of Roller |
| 1 | NO | 752 | +10 | 11 | 31 | X | SF | ⊙ |
| 2 | Yes | 812 | −35 | 6 | 28 | X | SP | X |
| 3 | Yes | 914 | −80 | 7 | 19 | O | SP | X |
| 4 | Yes | 980 | −130 | 4 | 26 | X | SP | X |
| 5 | Yes | 975 | −120 | 3 | 29 | Δ | SP | X |
| 6 | Yes | 823 | −33 | 9 | 24 | Δ | SP | X |
| 7 | Yes | 930 | −118 | 5 | 22 | Δ | SP | X |
| 8 | Yes | 901 | −95 | 9 | 27 | O | SP | X |
| 9 | Yes | 830 | −50 | 10 | 20 | ⊙ | SF | ⊙ |
| 10 | Yes | 882 | −70 | 9 | 18 | ⊙ | SF | ⊙ |
| 11 | Yes | 960 | −110 | 8 | 21 | ⊙ | SF | ⊙ |
| 12 | Yes | 904 | −80 | 9 | 23 | ⊙ | SF | ⊙ |

No. 1~No. 8 Test Specimen for Comparison
No. 9~No. 12 Test Specimen in the present invention
SF: Super Finish
SP: Shot Peening A pair of opposing rings 10 were attached with a space between them at two locations on the rotating shaft 9, which is driven by the motor. A pair of support members 12 formed on one side of the pressure plate 11, were separated so that they lined up with the rings 10. One test specimen 13 was rotatably supported by each of these support members through several rollers, so that the outer peripheral surface of the test specimens came into contact with the outer peripheral surface of the opposing rings 10. As a result of this construction, the test specimens 13 turned as the rotating shaft 9 turned. The endurance test was then performed on two test specimens 13 at the same time, using the test equipment as shown in FIG. 2.

The rotational speed of rotating shaft 9 was adjusted so that the rotational speed of the test specimens 13 was 5100 rpm. Also, a pressure force of 356 kgf was applied to the pressure plate 11 in the direction of the rotating shaft 9. Therefore, a radial load of 178 kgf was applied to each of the test specimens 13, at the point where the outer peripheral surface of the test specimens contacted the outer peripheral surface of the opposing rings 10. The outer peripheral surface of the opposing rings 10, before performing the test, had an average surface hardness of $H_RC$ 60 to 61, and the average surface roughness, Ra, was 0.38 to 0.45. Also, lubrication of the point of contact was performed by splashing it with mineral oil (10 W-30).

The test was performed for 400 hours, and was stopped several times during the test (initially at 20 hours, 50 hours, and 100 hours from start and then every 50 hours after that) in order that the surface of each test specimen, 13 was observed and checked for peeling. If peeling was found to have occurred, the test was stopped at that moment, so that the endurance test In Table 1, it should be noted that all of the specimens No. 9 to No. 12 indicate the numerical values within the limits of this invention, according to the present invention on the hardness, residual stress, residual austenite and average wave length, but that the specimens for comparison have at least one numerical value outside the limits of this invention. Also, of the maximum residual surface stress, those with a + sign, indicate residual tensile stress, and those with a − mark, indicate residual compressive stress.

The inner peripheral surface of the specimens No. 1 and No. 9 to No. 12 was subjected to superfinish after shotpeening, while the inner peripheral surface of the specimens No. 2 to No. 8 was subjected to shotpeening only.

On the other hand, the evaluation of the rolling surface of the roller is made as follows:

If peeling has occurred in at least one specimen, Symbol X was recorded, and if no peeling has occurred in all of the specimen until 400 hours has passed, Symbol ⊙ was recorded.

In addition, the roller in contact with the inner peripheral surface of the outer ring has sufficiently good anti-peeling property on its rolling surface together with anti-abrasion property on the outer peripheral surface of the shaft.

The rolling/sliding member of this invention withstand peeling, even under severe lubrication conditions, thus making it possible to use them in improving the life of the mechanical equipment they are used in. Therefore, they can be used effectively in industry. For example, by using these member, the period of time between equipment inspections can be enlarged, making equipment more maintenance free.

In the outer ring, for a cam follower of a valve drive mechanism, of this invention made as described above, the outer peripheral surface of the outer ring is strengthened, and the surface roughness is formed so that an oil film could be formed on it easily, thus preventing the occurrence of peeling on the outer peripheral surface of the outer ring. Also, because the inner peripheral surface is super-finished, the roughness is very minute, and oil film parameter between the inner peripheral surface and the rolling surface of the super-finished rollers or the outer peripheral surface of the shaft, is very large, thus longer life of the shaft and rollers can be expected. Also, the durability of the entire cam follower apparatus, with an outer ring, is improved.

What is claimed is:

1. A rolling/sliding member for use in at least one of rolling and sliding contacts with other parts, having a surface and a surface layer being 0 to 50 $\mu$m deep from the surface, the surface having an average wave length of surface roughness up to 25 $\mu$m, and the surface layer having a residual compressive stress of 50 to 110 kgf/mm$^2$, and a hardness of Hv830 to Hv960, and a microstructure including residual austenite more than 7 volume %.

2. A cam follower apparatus for engine comprising a shaft and an outer ring rotatably supported around the shaft, the outer ring having a surface and a surface layer being is 0 to 50 $\mu$m deep from the surface, the surface having an average wave length of surface roughness up to 25 $\mu$m, and, the surface layer having a residual compressive stress of 50 to 110 kgf/mm$^2$, a hardness of Hv 830 to Hv960, and a microstructure including residual austenite more than 7 volume %, and the surface of the outer ring has a superfinished portion on a side opposed to the shaft.

* * * * *